United States Patent
Balasubramanian et al.

(10) Patent No.: US 9,936,380 B2
(45) Date of Patent: Apr. 3, 2018

(54) PREDICTIVE PAIRWISE MASTER KEY CACHING

(71) Applicant: Cisco Technology, Inc., San Jose, CA (US)

(72) Inventors: Karthikeyan Balasubramanian, Bangalore (IN); V. S.Vinodh Kumar, Bangalore (IN); Ashvin Lingam, Bangalore (IN); Mubeesh Ali V. M., Palakkad (IN)

(73) Assignee: Cisco Technology, Inc., San Jose, CA (US)

( * ) Notice: Subject to any disclaimer, the term of this patent is extended or adjusted under 35 U.S.C. 154(b) by 390 days.

(21) Appl. No.: 14/579,020

(22) Filed: Dec. 22, 2014

(65) Prior Publication Data

US 2016/0183084 A1     Jun. 23, 2016

(51) Int. Cl.
*H04L 29/06* (2006.01)
*H04W 12/04* (2009.01)
*H04W 36/00* (2009.01)

(52) U.S. Cl.
CPC ........... *H04W 12/04* (2013.01); *H04L 63/065* (2013.01); *H04L 63/104* (2013.01); *H04W 36/0038* (2013.01)

(58) Field of Classification Search
CPC .... H04L 63/065; H04L 63/104; H04W 12/04; H04W 36/0038
See application file for complete search history.

(56) References Cited

U.S. PATENT DOCUMENTS

| | | | |
|---|---|---|---|
| 7,558,388 B2 | 7/2009 | Ptasinski | |
| 7,672,459 B2 | 3/2010 | O'Hara, Jr. et al. | |
| 7,873,352 B2 | 1/2011 | Nguyen et al. | |
| 7,936,879 B2 | 5/2011 | Ptasinski | |
| 2006/0191000 A1* | 8/2006 | O'Hara, Jr. ........... | H04L 63/062 726/12 |
| 2011/0274082 A1* | 11/2011 | Calhoun ............... | H04W 40/24 370/331 |

* cited by examiner

*Primary Examiner* — Brandon Hoffman
*Assistant Examiner* — Thong Truong
(74) *Attorney, Agent, or Firm* — Edell, Shapiro & Finnan, LLC (57) ABSTRACT

A client device is authenticated in a wireless local area network using a pairwise master key when the client device associates to a first access point. A set of neighbor devices to the client device is generated. The set includes less than a total number of access points in the wireless local area network. The pairwise master key is distributed to the neighbor devices such that the pairwise master key is not distributed to access points outside of the set of neighbor devices. Data representing the set of neighbor devices for the client device is maintained.

21 Claims, 7 Drawing Sheets

PREDICTIVE PAIRWISE MASTER KEY CACHING

TECHNICAL FIELD

The present disclosure relates to wireless local area networks, and in particular, the distribution of pairwise master keys in wireless local area networks.

BACKGROUND

In wireless local area networks (WLANs), wireless client devices access the network through wireless access points. A WLAN controller is usually included to manage and interconnect WLAN access points. During authentication with the WLAN, a client device will be assigned a pairwise master key (PMK) to allow for secure communication between the client device and the access point through which it is accessing the WLAN. The PMK will be cached at the access point to allow the client device to disassociate, and subsequently re-associate (without re-authentication) to the WLAN through the access point. Because the PMK remains cached in the access point, the WLAN can avoid traffic that may otherwise be necessary to re-authenticate the client device. Common PMK caches that are located at access points may store approximately 2000+ PMKs.

Client devices accessing a WLAN (which may include cell phones, laptop computers, tablet computers, and other mobile network devices) may travel within a mobility group or mobility domain of the WLAN. A mobility group or domain includes a series of access points or WLAN controllers spread over a geographic region that a client can use to access the WLAN without having to re-authenticate at each new access point. To allow for any access point or WLAN controller in a mobility domain to allow access to a particular client device, the PMKs for the client devices are distributed to each access point and/or WLAN controller in the mobility domain.

In some implementations of WLANs, such as those defined by Institute of Electrical and Electronics Engineers (IEEE) standard 802.011r, client devices will be prevented from reconnecting to a WLAN if they cease to be connected to at least one access point or WLAN controller of the WLAN for a timeout period, typically around 100 seconds. These implementations are suitable for WLANs that have strong coverage areas. Other implementations will cache the PMKs for client devices until the hardware of the access points and/or WLAN controller is disabled or until a maximum timeout of 86,400 second (i.e., 24 hours) is reached. This is the preferred method in WLANs with sparse wireless coverage.

DESCRIPTION OF EXAMPLE EMBODIMENTS

Overview

A client device is authenticated in a wireless local area network using a pairwise master key when the client device associates to a first access point. A set of neighbor devices to the client device is generated. The set includes less than a total number of access points in the wireless local area network. The pairwise master key is distributed to the neighbor devices such that the pairwise master key is not distributed to access points outside of the set of neighbor devices. Data representing the set of neighbor devices for the client device is maintained.

Example Embodiments

Figure 1:
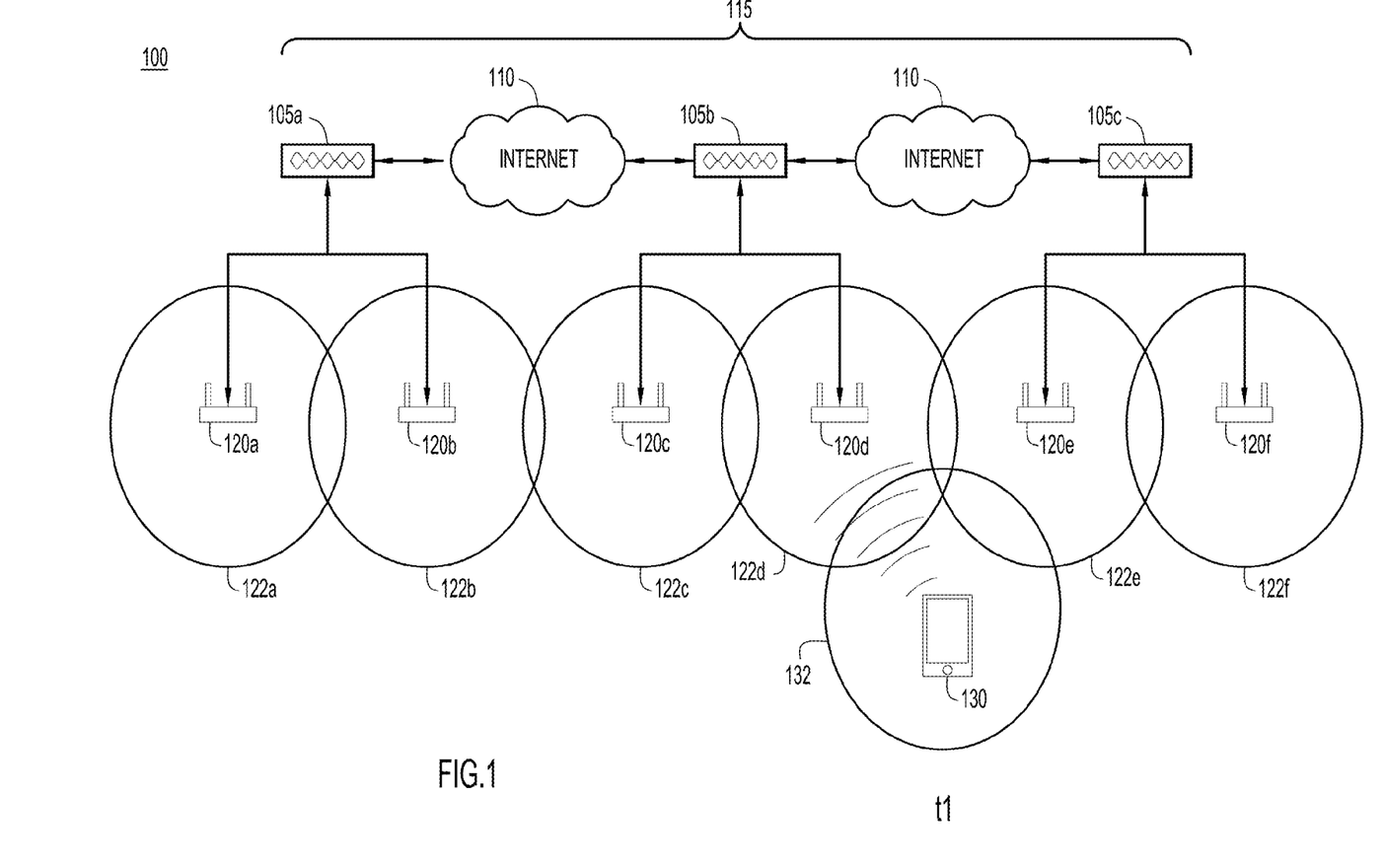
FIG. 1 is an illustration of a first wireless local area network configured to perform predictive pairwise master key caching at a first time, according to an example embodiment.

Depicted in FIG. 1 is a wireless local area network (WLAN) 100 that is configured to provide predictive pairwise master key (PMK) caching. In particular, WLAN 100 may be optimized to provide efficient primary key caching for WLAN implementations conforming with the Institute of Electrical and Electronics Engineers (IEEE) standard 802.011k for radio resource measurement. WLAN 100 is comprised of WLAN controllers 105*a-b* which are interconnected through the internet 110 to form a data backbone 115. Each of WLAN controllers 105*a-c* service one or more access points, 120*a-f*. According to the example embodiment of FIG. 1, WLAN controller 105*a* services access points 120*a* and 120*b*, WLAN controller 105*b* services access points 120*c* and 120*d*, and WLAN controller 105C services access points 120*e* and 120*f*. Each of access points 120*a-f* has a wireless range, such as a radio frequency (RF) range, as illustrated by ranges 122*a-f*, respectively.

When client 130 is authenticated to WLAN 100 at time t1, a PMK is used between the client 130 and the access point, such as access points 120*a-f*, via which client 130 connects to WLAN 100. Accordingly, when client 130 wirelessly connects to access point 120*d*, a PMK is generated during an authentication process, and this PMK is used to ensure secure communication between client 130 and access point 120*d*.

Client 130 may travel/move within what is known as a mobility domain of WLAN 100. A mobility domain allows client 130 to geographically roam within WLAN 100 while maintaining a data session, including virtual local area network (VLAN) and subnet memberships and Internet Protocol (IP) addresses, regardless of the access point via which client 130 accesses data backbone 115. In order to maintain the data session for client 130 as it moves geographically through WLAN 100, a procedure is in place to distribute the PMK for client 130 among access points 120a-f. The PMK will then be stored in a cache at access points 120a-f and WLCs 105a-c so that they may communicate with client 130.

One method for distributing the PMK for client 130 within WLAN 100 may be to simply distribute the PMK to each of access points 120a-f and WLAN controllers 105a-c as soon as client 130 is authenticated at access point 120d. This would have the benefit of allowing client 130 to travel anywhere within WLAN 100 as soon as client 130 is authenticated. On the other hand, this method of distributing the PMK may have adverse effects on WLAN 100, particularly if WLAN 100 services a large geographical area and/or a large number of client devices. For example, an owner of a chain of coffee shops may have a single WLAN implementation used to service all of its shops. It is unlikely that a client device in one coffee shop would access the WLAN in a different coffee shop within the timeout period for the WLAN. Accordingly, it would be wasteful to distribute the PMK for one client device to every access point in the WLAN. As a further example, in a stadium environment, thousands of spectators may seek to access a WLAN, all at the same time. With stadium capacities in the tens to hundreds of thousands, the memory of the access points allocated to the PMK cache may be easily filled if the access points are expected to store PMKs for every client device seeking to access the WLAN.

Another way to distribute the PMKs is to determine the "neighbor" devices for a client, and distribute the PMKs to this subset of devices within a WLAN. Specifically, the "first level neighbors" and the "second level neighbors" for a client device may be determined. As used herein, the "first level neighbors" for a client device are the access points that a client may directly wirelessly communicate with, the WLAN controllers which service those access points, and the access points that the client's access point can directly wirelessly communicate with. For example, the wireless range for client 130 (illustrated by reference numeral 132) overlaps with the wireless range for access point 120d (as illustrated by the overlap between range 132 and range 122d) and also overlaps with the wireless range for access point 120e (as illustrated by the overlap between range 132 and range 122e). Accordingly, access points 120d and 120e would be first level neighbors for client 130. Furthermore, access point 120c would be a first level neighbor because it is within the wireless range of access point 120d, the access point through which client 130 is accessing WLAN 100. WLAN controllers 105b and 105c would also be considered first level neighbors for client 130 as they are the WLAN controllers servicing access points 120d and 120e, respectively. "Second level neighbors" as used herein refers to neighbors of the first level neighbors. In other words, WLAN devices that may be in wireless communication with the first level neighbors, and WLAN controllers that service them. Accordingly, the second level neighbors for client 130 are access points 120b (which is in RF communication with first level neighbor access point 120c, as illustrated by the overlap of range 122b and 122c) and access point 120f (which is in wireless communication with first level neighbor access point 120e, as illustrated by the overlap of range 122e and 122f). WLAN controllers 105a and 105c would also be considered second level neighbors as they service access points 120b and 120f, respectively. Depending on the needs of WLAN 100, the PMKs for a particular client may be shared with only the first level neighbors, or the first level neighbors and the second level neighbors of that client.

Whether the PMK is distributed to first level neighbors, the second level neighbors, or higher level neighbors (e.g., third level neighbors which would be neighbors to the second level neighbors), will be based on the needs of a particular WLAN implementation. In essence, a prediction is made based on the specific WLAN implementation that a client device is only likely to roam between certain neighbor levels of its current access point, and the distribution of the PMK of the client device is limited to those neighbor levels.

By limiting the distribution of the PMKs to these "neighborhoods," space in the caches of the WLAN access points may be preserved, and more clients may be serviced by a particular WLAN, such as WLAN 100. According to the example of FIG. 1, it has been determined that the PMK for client 130 should be distributed to both the first and second level neighbors of client 130. Accordingly, the PMK for client 130 will be distributed to access points 120c and 120e as they are first level neighbors to client 130 at t1. Access points 120b and 120f will also receive the PMK for client 130 as they are second level neighbors for client 130 at time t1.

Figure 2:
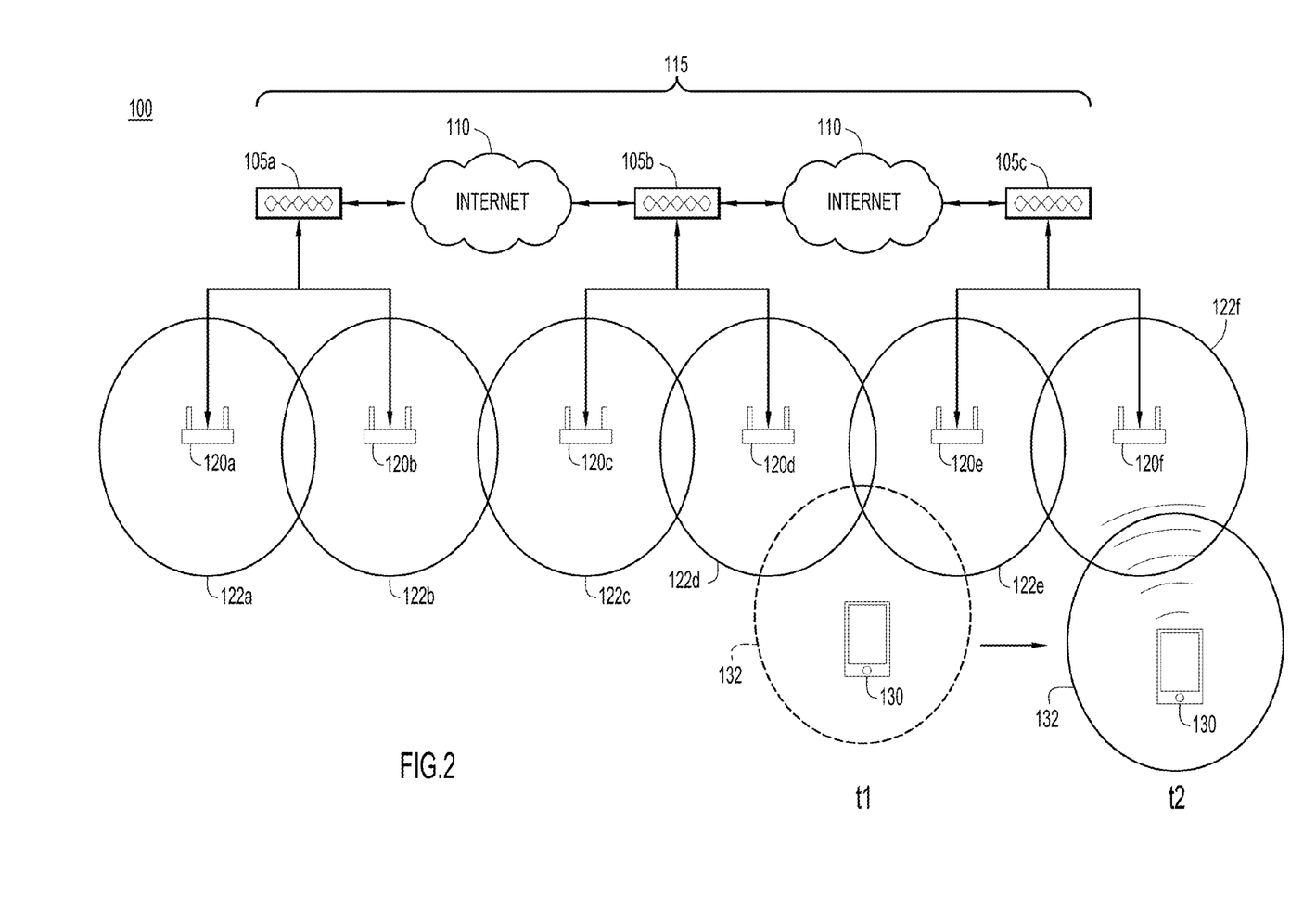
FIG. 2 is an illustration of the first wireless local area network configured to perform predictive pairwise master key caching at a second time, and illustrating the predictive caching of the pairwise master keys as it relates to a client device's change in location, according to an example embodiment.

With reference now made to FIG. 2, depicted therein is WLAN 100 in which client 130 has moved from its initial position at time t1 (illustrated with dashed lines) to another position at a later time t2. At time t1, client 130 was authenticated at access point 120d, its first and second level neighbors were determined, and the PMK for client 130 was distributed to both the first level neighbors of client 130 and the second level neighbors of client 130, as described above with reference to FIG. 1.

At time t2, client 130 has changed its geographic location so that it is now accessing WLAN 100 through access point 120f. Because access point 120f had previously received the PMK for client 130 as a second level neighbor of client 130, no further distribution of the PMK is necessary for client 130 to continue accessing WLAN 100. Accordingly, when client 130 moves to a location in which it accesses WLAN 100 through a first or second level neighbor to its previous location at time t1, there is no need for the elements of WLAN 100 to re-determine the first and second level neighbors for client 130, or to redistribute the PMK for client 130. On the other hand, had the PMK for client 130 only been distributed to first level neighbors of client 130 at time t1, accessing WLAN 100 from second level neighbor 120f at time t2 would necessitate the distribution of the PMK to access point 120f. Accordingly, the elements of WLAN 100 would undergo the process described above with reference to FIG. 1 to determine the first level neighbors of client 130 at time t2, and redistribute the PMK for client 130 to the first level neighbors for client 130 at time t2.

Figure 3:
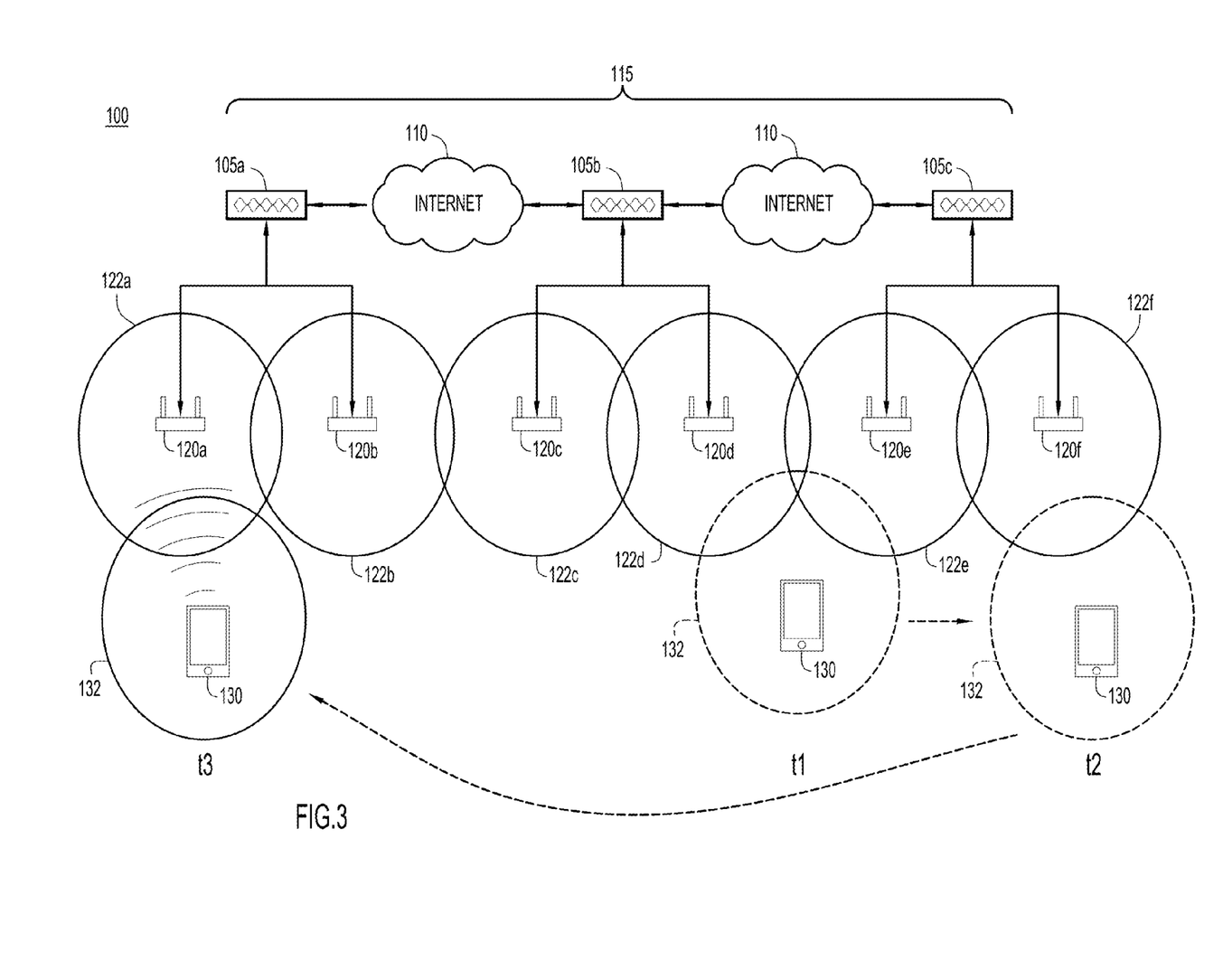
FIG. 3 is an illustration of the first wireless local area network configured to perform predictive pairwise master key caching at a third time, illustrating further aspects of the predictive caching of the pairwise master keys as it relates to a client device's change in location, according to an example embodiment.

With reference now made to FIG. 3, depicted therein is WLAN 100 when client 130 has moved to another geographic location at another later time t3. The location of client 130 at time t1 has continued to be illustrated with dashed lines, as has the position of client 130 at time t2. At time t3, client 130 is located at a geographic location where it will access WLAN 100 via access point 120a. Access point 120a was not a first or second level neighbor to client 130 at time t1 or time t2. Accordingly, regardless of whether or not the PMK was redistributed to the first and/or second level neighbors of client 130 at time t2, when client 130 accesses WLAN 100 via access point 120a, it will be necessary to re-determine the first and second level neighbors for client 130 at time t3, and redistribute the PMK for client 130 at time t3.

Figure 4:
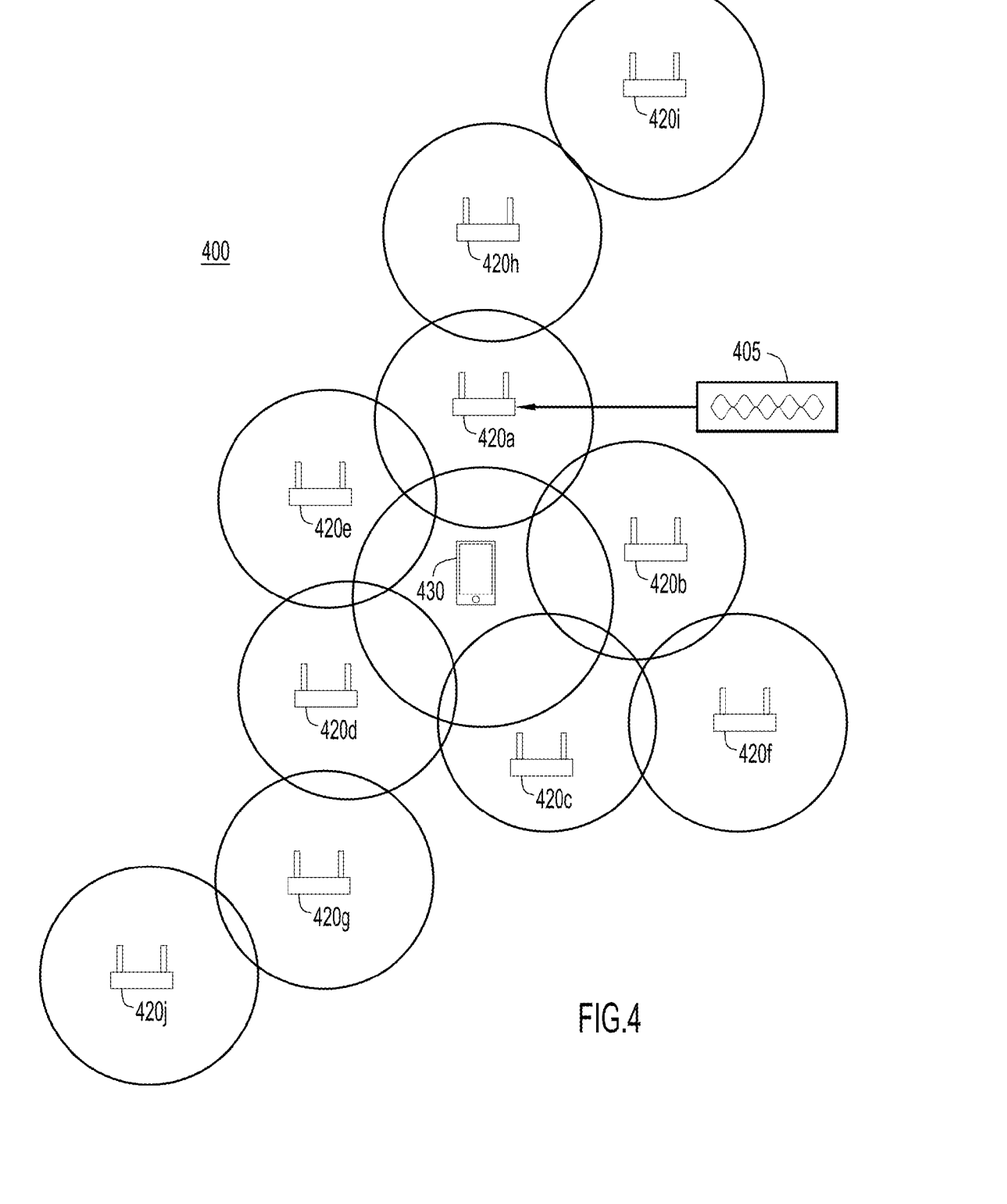
FIG. 4 is an illustration of a second wireless local area network configured to perform predictive pairwise master key caching, and in particular, illustrating the population of a master neighbor list according to an example embodiment.

With reference now made to FIG. 4, depicted therein is a WLAN 400 which will be used to describe an example embodiment in which client 430 accesses WLAN 400 according to IEEE standard 802.11k in conjunction with the distribution of the PMK for client 430 only to first and second level neighbors for client 430 as described herein. When client 430 joins WLAN 400 through access point 420a, the PMK for client 430 is stored in the WLAN controller 405 servicing access point 420a. Once client 430 is in the "RUN" state (i.e., after client 430 has been authenticated for access to WLAN 400), access point 420a (or the wireless controller servicing access point 420a) sends an IEEE 802.11k beacon request action frame to client 430. The beacon request is a request for client 430 to provide a neighbor report to access point 420a. More specifically, in response to the beacon request, client 430 will scan and collect information for all of the neighbors it can "detect" (i.e., all of the other access points within WLAN 400 that are within wireless range of client 420a). Information regarding these neighbors, including their identities, is returned to access point 420a. Accordingly, client 430 will report to access point 420a that access points 420b-e are all within wireless range of client 430. In other words, client 430 provides a portion of the first level neighbor list to access point 430a.

Having received the neighbor report from client 430, access point 420a will forward the report to WLAN controller 405. When implemented in accordance with IEEE 802.11k, WLAN controller 405 can leverage what is known as a Radio Resource Measurement (RRM) neighbor list to determine the full first neighbor level list, and the second level neighbors for each of the first level neighbors. Specifically, as part of its controlling functionality, WLAN controller 405 will have an RRM neighbor list for each of the access points within WLAN 400, i.e., a list of all of the first level neighbors for each access point in WLAN 400. By combining the beacon response neighbor list received from client 430 with the RRM neighbor lists for access point 420a, and the RRM neighbor lists for the access points indicated in the beacon response list, WLAN controller 405 can build the complete first level neighbor list.

Specifically, WLAN controller 405 will append the neighbor list received from client 430, which includes access points 420a-e with the RRM neighbor list for access point 420a, which includes access points 420b, 420e and 420h. This newly created neighbor list (containing access points 420b, 420c, 420d, 420e and 420h)) is the complete first level neighbor list for client 430.

To determine the second level neighbor list, WLAN controller 405 will leverage the RRM neighbor lists to determine the neighbors for the entries in the first level neighbor list. In other words, the RRM neighbors lists will indicate that the following access points are second level neighbors:

Neighbors of access point 420b: access points 420a, 420c and 420f;
Neighbors of access point 420c: access points 420b, 420d and 420f;
Neighbors of access point 420d: access points 420c, 420e and 420g
Neighbors of access point 420e: access points 420a and 420d;
Neighbors of access point 420h: access points 420a and 420i.

Combining the data above with the first level neighbors results in a master neighbor list results in the following access points: 420a, 420b, 420d, 420c, 420e, 420f, 420g, 420h and 420i. Access point 420j is not included in this list because it is not a second level neighbor. Instead, it could be considered a third level neighbor as it is a neighbor to second level neighbor access point 420. With the master neighbor list generated, the PMK for client 430 is distributed to all of the members in the master neighbor list by WLAN controller 405. Accordingly, each of access points 420a, 420b, 420d, 420c, 420e, 420f, 420g, 420h and 420i will create an entry in their PMK caches, and the PMK for 430 will be replicated at each of these access points.

According to some example embodiments, to avoid computation complexity, when the client 430 roams to a new access point within the master neighbor list, the master neighbor list is maintained and a new master neighbor list is not calculated. Similarly, the PMK caches for each access point in the master neighbor list are not altered, nor is the PMK for client 430 redistributed. For example, if client 430 roams to access point 420f, no changes will be made to the master neighbor list because access point 420f is already in the master neighbor list. On the other hand, when client 430 roams to a new access point outside of the master neighbor list (e.g., access point 420j), then a new master neighbor list may be created and the PMK for client 430 may be redistributed as necessary. Similarly, access points that are no longer part of the master neighbor list will remove the PMK for client 430 from their PMK cache, freeing up memory so that other client devices may be serviced by WLAN 400.

According to another example embodiment, the process described above may be limited to using the first level neighbors. The process for determining the master neighbor list for such an example embodiment would be begin like the process described above. Specifically, once client 430 joins WLAN through access point 420a, the PMK for client 430 is stored in WLAN controller 405. As soon as client 430 is in the RUN state, access point 420a or WLAN controller 405 will fetch the RRM neighbor list for access point 420a. A response from client 430 to an 802.11k beacon request can be added to the RRM list for access point 420a, which will serve as the master neighbor list, which in this example would be limited to first level neighbors. The PMK for client 430 will be replicated to the entries in the master neighbor list (i.e., replication will be limited to the first level neighbors).

Other example embodiments may extend the master neighbor list to include third level neighbors, fourth level neighbors, or even high level neighbors without straying from the scope of the present disclosure. In other words, so long as a limitation on the distribution of the PMK is determined based on the "neighborhood" of the access points or WLAN controllers, the distribution of the PMKs is within the scope of the embodiments presented herein. Other example embodiments may leverage information such as the information contained in a configuration location string for access point groups in conjunction with the RRM neighbor lists in order to derive the master neighbor list to which the PMK for a particular client will be distributed.

Figure 5:
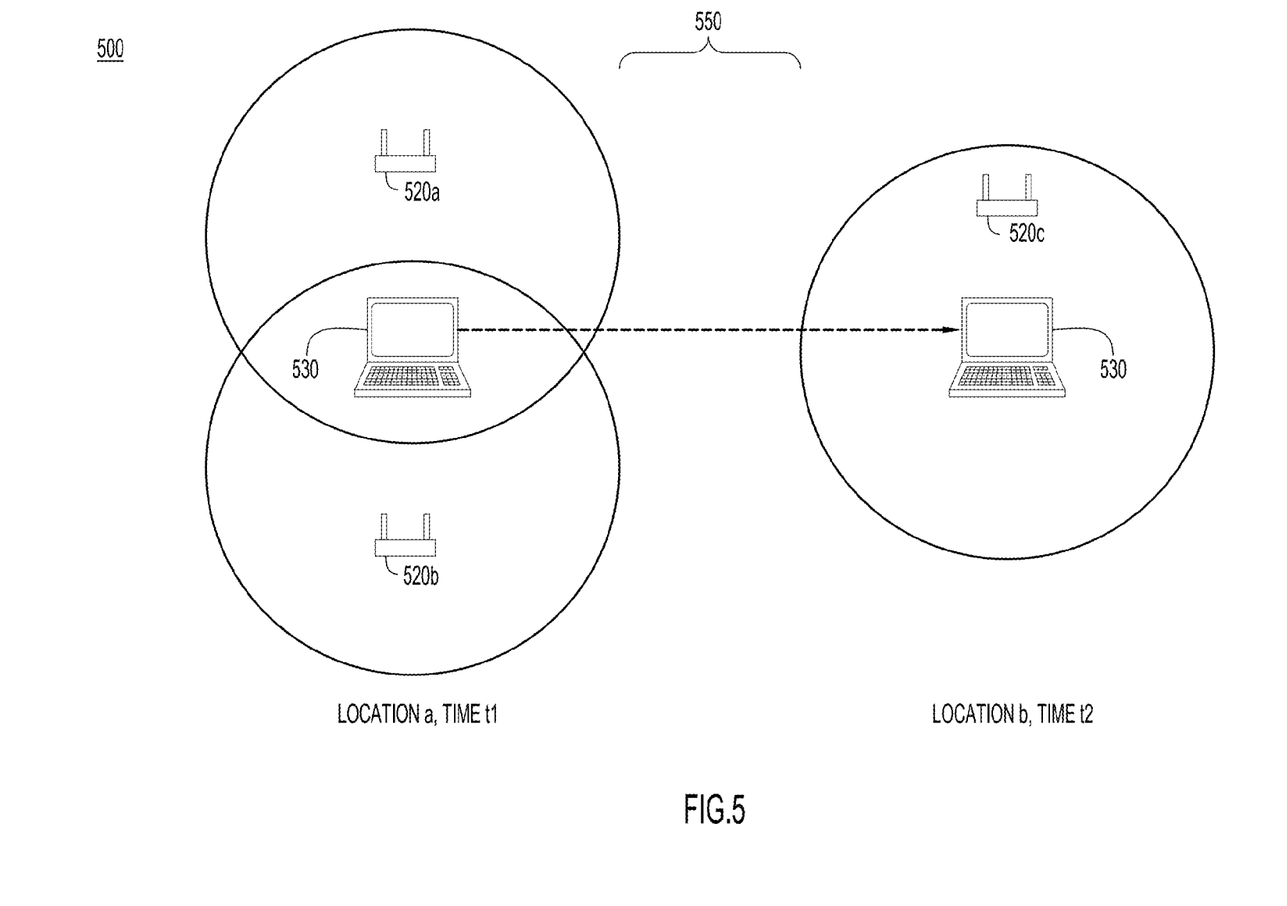
FIG. 5 is an illustration of a third wireless local area network configured to perform predictive pairwise master key caching in a wireless local area network that includes wireless coverage gaps, according to an example embodiment.

With reference now made to FIG. 5, depicted therein is a sparsely serviced WLAN 500. The master neighbor list, as discussed above with reference to FIG. 4 can be used to supplement the information known to "isolated" access points, such as access point 520c in FIG. 5. With service gap 550 located between the areas serviced by access points 520a, 520b and 520c, access point 520c will not be able to detect beacons of the other access points in WLAN 500. Similarly, the RRM neighbor lists as defined by IEEE 802.11k will not indicate that there are any other access points arranged close to access point 520c. By leveraging the master neighbor list disclosed herein, access point 520c can be made aware of access points 520a and 520b.

Specifically, when client 530 joins WLAN 500 at location "a" and at time t1, it would undergo the process described above to generate a master neighbor list. This master neighbor list will be maintained until a new list is generated. Accordingly, when client 530 moves from location "a" at time t1, to location "b" at time t2, the master neighbor list created at location "a" is still retained. As client 530 passes from location "a" to location "b," client 530 will detect a beacon from access point 520c, and access point 520c can be added to the master neighbor table. In other words, because the prediction has been made that client 530 will only access a subset of access points, when client 530 encounters a new access point, such as access point 520c, it may serve as an indication that this access point is relatively close to the access points in the master neighbor list for client 530. Accordingly, access point 520c may be made aware of the other access points in the master neighbor list for client 530, mainly access points 520a and 520b.

As soon as client 530 associates to access point 520c in location "b," the master neighbor table can be leveraged through a beacon report request (e.g., in the Beacon TABLE MODE as defined in the IEEE 802.11k standard which returns the current wireless station neighbor table information in the beacon report response). Because access point 520a and 520b are still contained in the master neighbor table, access point 520c may be made aware of the existence and location of access points 520a and 520b. This additional information may be leveraged for more efficient sharing of PMKs, and will result in optimal storage of the PMK.

Figure 6:
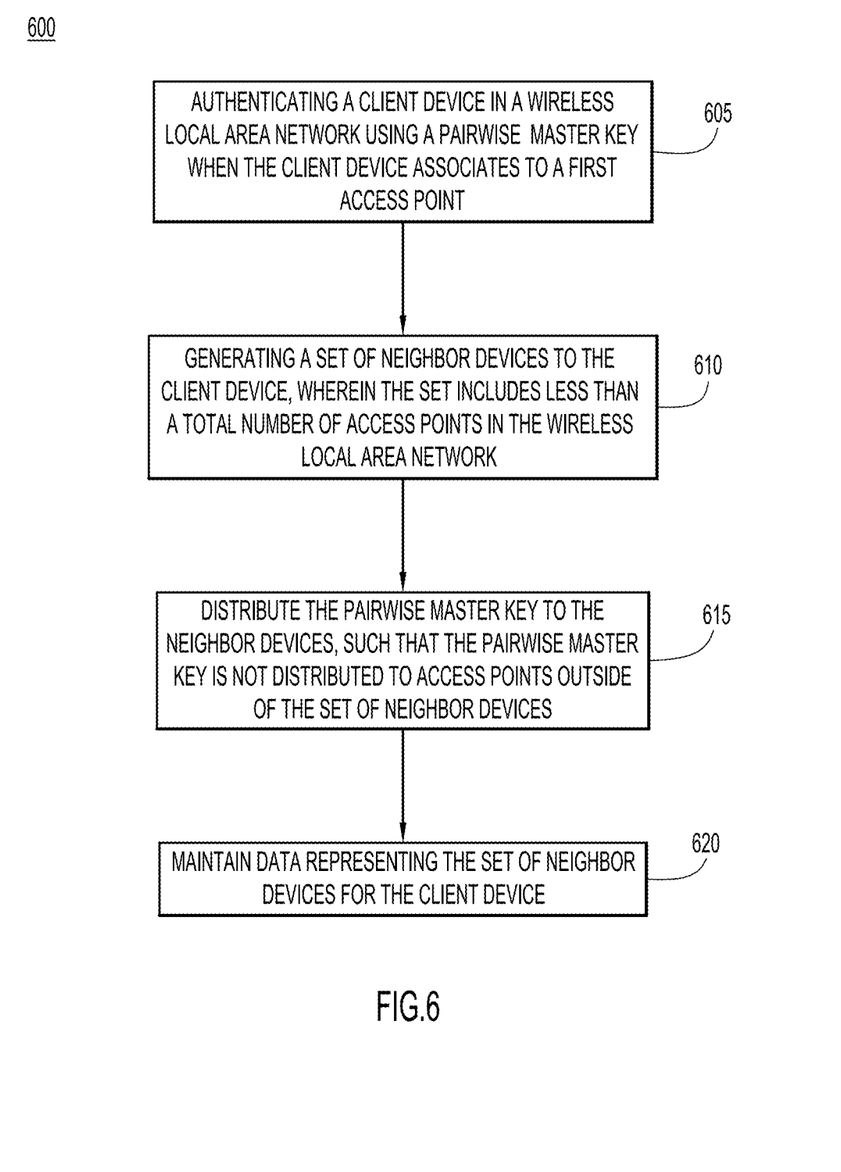
FIG. 6 is a flowchart illustrating a process for providing predictive pairwise master key caching in a wireless local area network, according to an example embodiment.

With reference now made to FIG. 6, depicted therein is a flowchart 600 illustrating an example process for performing the techniques described above with reference to FIGS. 1-5. The process begins in 605 where a client device is authenticated in a wireless local area network when it associates to a first access point. The authentication process uses a pairwise master key.

In 610, a set of neighbor devices (such as first level neighbors or second level neighbors) to the client device is generated. For example, the set may be a master neighbor list which is generated according to the examples described above with reference to FIG. 4.

In 615, the pairwise master key is distributed to the neighbor devices. Specifically, the distribution of the pairwise master key may be limited to just the neighbor devices. In other words, the pairwise master key is not distributed to all of the access points in the WLAN.

In 620, data representing the set of neighbor devices to the client device is maintained using, for example, the techniques described above with reference to FIG. 5. Similarly, the data representing the set will be maintained even if the client roams to another access point, so long as the access point is included in the list.

Figure 7:
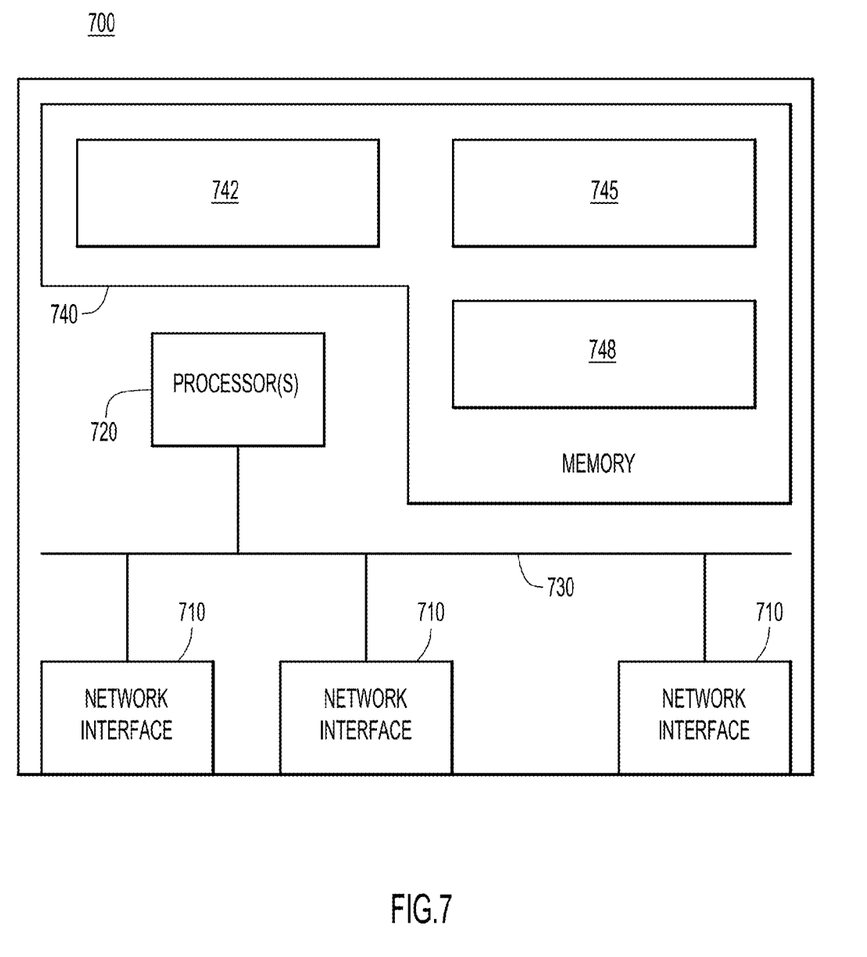
FIG. 7 is a block diagram of a device configured to provide predictive pairwise master key caching in a wireless local area network, according to an example embodiment.

With reference now made to FIG. 7, an example block diagram is shown of a device 700, such as a WLAN access point or WLAN controller like those illustrated in FIG. 1, that is configured to perform the techniques described herein. WLAN device 700 comprises communication interfaces 710 which may be used to connect to other WLAN devices, such as access points, client devices and WLAN controllers. Accordingly, network interfaces 710 maybe embodied as wireless network interfaces. One or more processors 720 are provided to coordinate and control WLAN device 700. The processor 720 is, for example, one or more microprocessors or microcontrollers, and it communicates with the network interface 710 via bus 730.

Memory 740 comprises software instructions 742 which may be executed by the processor 720. For example, software instructions 742 for WLAN device 700 include instructions for performing predictive PMK caching as described above with reference to FIGS. 1-6. In other words, memory 740 includes instructions for WLAN device 700 to carry out the operations described above in connection with FIGS. 1-6. Also stored in memory 740 are PMK cache 745 and master neighbor list 748.

Memory 740 may comprise read only memory (ROM), random access memory (RAM), magnetic disk storage media devices, optical storage media devices, flash memory devices, electrical, optical or other physical/tangible (e.g. non-transitory) memory storage devices. Thus, in general, the memory 740 may comprise one or more tangible (non-transitory) computer readable storage media (e.g., a memory device) encoded with software comprising computer executable instructions. When the software 742 is executed (by the processor 720), the processor is operable to perform the operations described herein in connection with FIGS. 1-6.

In summary, embodiments are presented herein to exploit neighbor table entries in order to optimize the pairwise master key entry sharing among access points, and thereby optimize memory usage in the access points.

In one form, a method is provided comprising: authenticating a client device in a wireless local area network using a pairwise master key when the client device associates to a first access point; generating a set of neighbor devices to the client device, wherein the set includes less than a total number of access points in the wireless local area network; distributing the pairwise master key to the neighbor devices such that the pairwise master key is not distributed to access points outside of the set of neighbor devices; and maintaining data representing the set of neighbor devices for the client device.

In another form, an apparatus is provided comprising a network interface unit that communicates over a wireless local area network; a memory; and a processor coupled to the network interface unit and the memory, wherein the processor: authenticates a client device in the wireless local area network using a pairwise master key when the client device associates to a first access point; generates a set of neighbor devices to the client device, wherein the set includes less than a total number of access points in the wireless local area network; distributes the pairwise master key to the neighbor devices such that the pairwise master key is not distributed to access points outside of the neighbor devices; and maintains data representing the set of neighbor devices to the client device in the memory.

In still another form, a tangible, non-transitory computer readable storage media is provided encoded with instructions that when executed by a processor cause the processor to: authenticate a client device in a wireless local area network using a pairwise master key when the client device associates to a first access point; generate a set of neighbor devices to the client device, wherein the set includes less than a total number of access points in the wireless local area network; distribute the pairwise master key to the neighbor devices such that the pairwise master key is not distributed to access points outside of the neighbor devices; and maintain data representing the set of neighbor devices to the client device.

The above description is intended by way of example only. Various modifications and structural changes may be made therein without departing from the scope of the concepts described herein and within the scope and range of equivalents of the claims.

What is claimed is:

1. A method comprising:
   authenticating a client device to a mobility domain in a wireless local area network using a pairwise master key when the client device associates to a first access point;
   generating a set of neighbor devices to the client device in the mobility domain, wherein the set of neighbor devices includes less than a total number of access points in the mobility domain, wherein the set of neighbor devices comprises first level neighbors or a combination of first level neighbors and second level neighbors, wherein the first level neighbors are access points within range of the client device for direct wireless communication, wireless local area network controllers which service the access points within range of the client device for direct wireless communication, and access points within range of the first access point for direct wireless communication, and wherein the second level neighbors are access points and wireless local area network controllers within range of the first level neighbors for direct wireless communication;
   distributing the pairwise master key to the set of neighbor devices such that the pairwise master key is not distributed to access points in the mobility domain outside of the set of neighbor devices; and
   maintaining data representing the set of neighbor devices for the client device.

2. The method of claim 1, wherein:
   distributing the pairwise master key comprises distributing the pairwise master key to the first level neighbors and the second level neighbors, such that the pairwise master key is not distributed to access points outside of the second level neighbors of the client device.

3. The method of claim 1, wherein:
   generating the set of neighbor devices comprises generating the set of neighbor devices to include the first level neighbors of the client device; and
   distributing the pairwise master key comprises distributing the pairwise master key such that the pairwise master key is not distributed to the second level neighbors.

4. The method of claim 1, further comprising:
   determining that the client device has accessed the wireless local area network through a second access point within the mobility domain, wherein the second access point is not in the set of the neighbor devices to the client device;
   regenerating the set of neighbor devices to the client device based on the second access point;
   distributing the pairwise master key to the set of neighbor devices in the regenerated set, such that the pairwise master key is not distributed to access points outside of the set of neighbor devices in the regenerated set; and
   maintaining data representing the regenerated set of neighbor devices.

5. The method claim 1, further comprising:
   determining that the client device has accessed the wireless local area network through a second access point within the mobility domain, and
   wherein the second access point is in the set of neighbor devices to the client device,
   wherein the data representing the set of neighbor devices is maintained without modification, and
   wherein the pairwise master key is not distributed in response to the determining.

6. The method of claim 1, wherein generating the set of neighbor devices comprises receiving a response to a beacon request.

7. The method of claim 6, wherein generating the set of neighbor devices to the client device further comprises determining a neighbor for an access point indicated in the response.

8. An apparatus comprising:
   a network interface unit that communicates over a wireless local area network;
   a memory; and
   a processor coupled to the network interface unit and the memory, wherein the processor:
     authenticates a client device to a mobility domain in the wireless local area network using a pairwise master key when the client device associates to a first access point;
     generates a set of neighbor devices to the client device, wherein the set of neighbor devices includes less than a total number of access points in the mobility domain, wherein the set of neighbor devices comprises first level neighbors or a combination of first level neighbors and second level neighbors, wherein the first level neighbors are access points within range of the client device for direct wireless communication, wireless local area network controllers which service the access points within range of the client device for direct wireless communication, and access points within range of the first access point for direct wireless communication, and wherein the second level neighbors are access points and wireless local area network controllers within range of the first level neighbors for direct wireless communication;
     distributes the pairwise master key to the set of neighbor devices such that the pairwise master key is not distributed to access points in the mobility domain outside of the set of neighbor devices; and
     maintains data representing the set of neighbor devices to the client device in the memory.

9. The apparatus of claim 8 wherein the processor further:
   distributes the pairwise master key by distributing the pairwise master key to the first level neighbors and the second level neighbors, such that the pairwise master key is not distributed to access points outside of the second level neighbors of the client device.

10. The apparatus of claim 8, wherein the processor further:
    generates the set of neighbor devices by generating the set to include the first level neighbors of the client device, and
    distributes the pairwise master key by distributing the pairwise master key such that the pairwise master key is not distributed to the second level neighbors.

11. The apparatus of claim 8, wherein the processor further:
    determines that the client device has accessed the wireless local area network through a second access point within the mobility domain, wherein the second access point is not in the set of the neighbor devices to the client device;
    regenerates the set of neighbor devices to the client device based on the second access point;
    distributes the pairwise master key to the neighbor devices in the regenerated set, such that the pairwise master key is not distributed to access points in the mobility domain outside of the set of neighbor devices in the regenerated set; and maintains data representing the regenerated set of neighbor devices in the memory.

12. The apparatus of claim 8, wherein:

the processor further determines that the client device has accessed the wireless local area network through a second access point within the mobility domain, the second access point is in the set of neighbor devices to the client device, the data representing the set of the neighbor devices is maintained without modification, and the pairwise master key is not distributed in response to the determining.

13. The apparatus of claim 8, wherein the processor generates the set of neighbor devices by receiving a response to a beacon request.

14. The apparatus of claim 13, wherein the processor generates the set of the neighbor devices to the client device by determining a neighbor for an access point indicated in the response.

15. A tangible, non-transitory computer readable storage media encoded with instructions that when executed by a processor cause the processor to:

authenticate a client device to a mobility domain in a wireless local area network using a pairwise master key when the client device associates to a first access point;

generate a set of neighbor devices to the client device, wherein the set of neighbor devices includes less than a total number of access points in the mobility domain, wherein the set of neighbor devices comprises first level neighbors or a combination of first level neighbors and second level neighbors, wherein the first level neighbors are access points within range of the client device for direct wireless communication, wireless local area network controllers which service the access points within range of the client device for direct wireless communication, and access points within range of the first access point for direct wireless communication, and wherein the second level neighbors are access points and wireless local area network controllers within range of the first level neighbors for direct wireless communication;

distribute the pairwise master key to the set of neighbor devices such that the pairwise master key is not distributed to access points in the mobility domain outside of the set of neighbor devices; and maintain data representing the set of neighbor devices to the client device.

16. The computer readable storage media of claim 15, wherein the instructions further cause the processor to:

distribute the pairwise master key by distributing the pairwise master key to the first level neighbors and the second level neighbors, such that the pairwise master key is not distributed to access points outside of the second level neighbors of the client device.

17. The computer readable storage media of claim 15, wherein the instructions further cause the processor to:

generate the set of neighbor devices by generating the set of neighbor devices to include first level neighbors of the client device; and distribute the pairwise master key by distributing the pairwise master key to first level neighbors of the client device, such that the pairwise master key is not distributed to the second level neighbors.

18. The computer readable storage media of claim 15, wherein the instructions further cause the processor to:

determine that the client device has accessed the wireless local area network through a second access point in the mobility domain, where in the second access point is not in the set of the neighbor devices to the client device;

regenerate the set of neighbor devices to the client device based on the second access point;

distribute the pairwise master key to the neighbor devices in the regenerated set, such that the pairwise master key is not distributed to access points in the mobility domain outside of the regenerated set of neighbor devices in the regenerated set; and maintain data representing the regenerated set of neighbor devices in the memory.

19. The computer readable storage media of claim 15, wherein the instructions further cause the processor to determine that the client device has accessed the wireless local area network through a second access point in the mobility domain, wherein the second access point is in the set of neighbor devices to the client device, wherein the data representing the set of the neighbor devices is maintained without modification, and wherein the pairwise master key is not distributed in response to the determining.

20. The computer readable storage media of claim 15, wherein the instructions further cause the processor to generate the set of neighbor devices by receiving a response to a beacon request.

21. The computer readable storage media of claim 20, wherein the instructions further cause the processor to generate the set of the neighbor devices to the client device by determining a neighbor for an access point indicated in the response.

* * * * *